May 21, 1963  J. R. HUSTON ET AL  3,090,740
SEMIDIRECT EQUIPMENT MAINTENANCE
Filed May 14, 1957 3 Sheets-Sheet 1

INVENTORS
John R. Huston,
William A. Webb,
Robert G. McGrath &
Woodrow E. Johnson
BY
Arthur T. Stratton
ATTORNEY

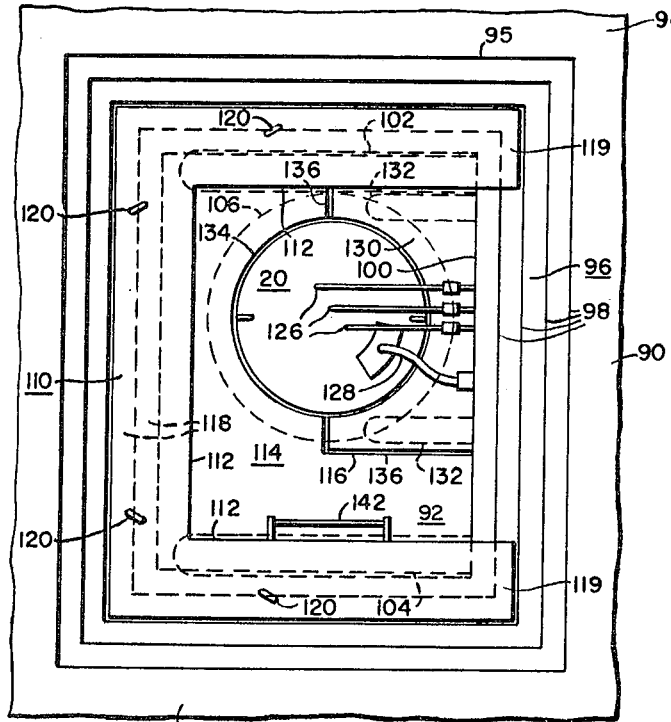
Fig. 2.
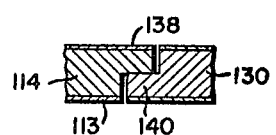
Fig. 4.
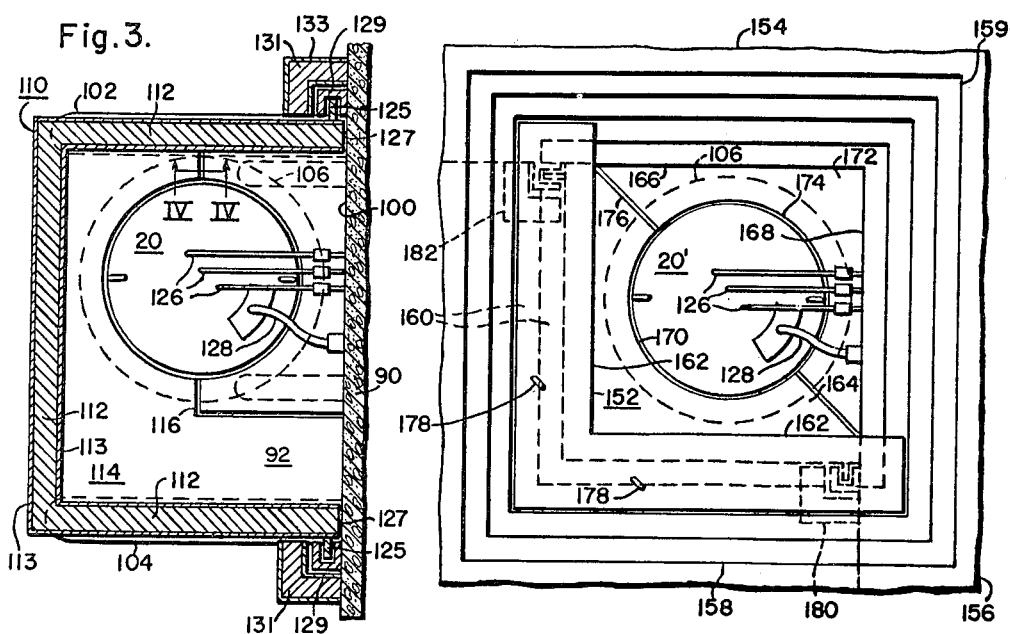
Fig. 3.
Fig. 5.

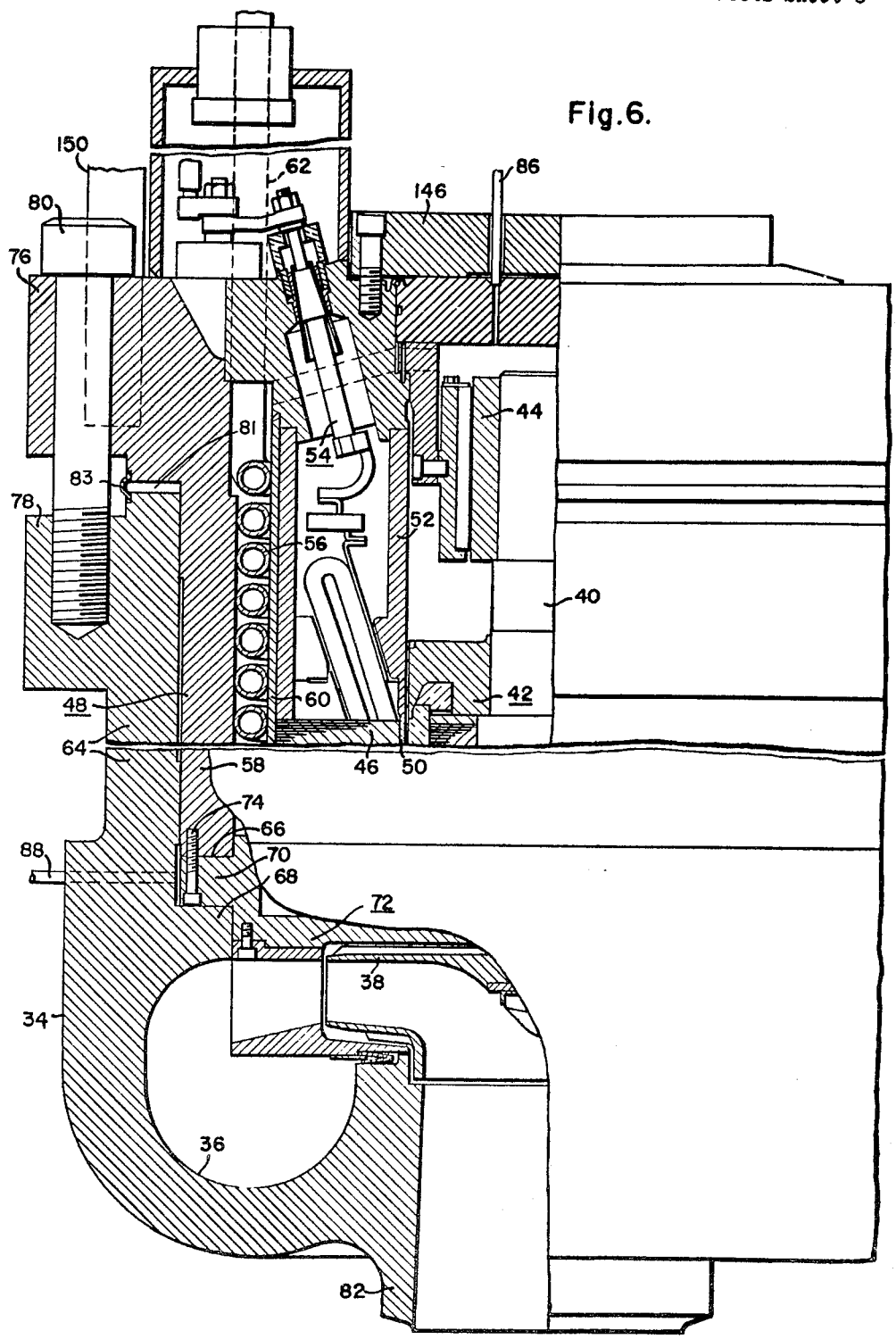

United States Patent Office 3,090,740
Patented May 21, 1963

3,090,740
SEMIDIRECT EQUIPMENT MAINTENANCE
John R. Huston, Trafford, William A. Webb, Verona, Robert G. McGrath, Churchill, and Woodrow E. Johnson, Pittsburgh, Pa., assignors to Westinghouse Electric Corporation, East Pittsburgh, Pa., a corporation of Pennsylvania
Filed May 14, 1957, Ser. No. 659,003
3 Claims. (Cl. 204—193.2)

The present invention relates to methods and apparatus adapted for use in maintaining highly radioactive equipment associated with a nuclear power plant and, more particularly, to the maintenance of a circulating nuclear fuel pump employed in conjunction with a homogeneous or circulating fuel-type nuclear reactor.

In the operation of the aforesaid homogeneous-type reactor plants, one example of which is described and claimed in the copending application of W. A. Webb, J. R. Huston, W. P. Haass and W. E. Johnson, entitled Nuclear Reactor Plant, Serial No. 659,004, filed May 14, 1957, and assigned to the present assignee, a more or less homogeneous reactor fuel is circulated through a reactor vessel of sufficient size to include a critical mass of the circulating fuel mixture. From a manifold associated with the reactor vessel, the flow of the nuclear fuel is divided into a number of primary coolant loops. By a number of pumps disposed one in each of the aforesaid loops after passing through a steam-generating heat exchanger disposed in each of the aforesaid loops, the circulating fuel is returned to another manifold associated with the reactor vessel where the individual streams of nuclear fuel flowing through the coolant loops are combined for flow through the reactor vessel. Various auxiliary equipment is provided for adding additional fuel or nuclear fertile materials to the circulating fuel systems for bleeding off a portion of the circulating fuel in order to remove fission products and to remove gaseous components of the liquid vehicle or carrier employed for dissolving or suspending the nuclear fuel for maintaining the desired pressure within the system and the like. The aforedescribed brief summary of this type of atomic plant is described in greater detail in the aforesaid copending application, and accordingly, a more detailed description thereof is dispensed with here. Suffice it to say, however, that in one application of the invention the circulating nuclear fuel is provided in the form of a finely divided suspension of thorium oxide and uranium oxide in a water or deuterium oxide vehicle.

When a circulating fuel of the character described is employed, the primary coolant loops of the homogeneous reactor plant become permanently radioactive due to neutronic irradiation of each coolant loop by the fluid nuclear fuel being circulated therethrough. Since this radioactivity is induced within the structural metals of the coolant loop components, including the aforementioned pump, the radioactivity cannot be removed by ordinary decontamination processes. Moreover, this problem is complicated by limited deposition of radioactive slurry particles in the case of the aforementioned slurry-type homogeneous fuel, which particles are incapable of being removed in their entirety by water purges or other decontaminating measures. Therefore, the virtual impossibility of decontaminating the pump and other related system components precludes direct personnel access to the primary coolant loops for maintenance during shutdown of the nuclear plant.

In view of the foregoing, it is an object of the invention to provide means for semidirectly maintaining the system components of a primary coolant loop associated with a nuclear reactor plant.

Another object of the invention is to provide semidirect maintenance means of the character described but which are adapted particularly for use with the circulating pump of the aforesaid coolant loop.

A further object of the invention is to provide portable shielding means arranged to permit limited access of maintenance personnel to the aforesaid primary coolant loop components or to other equipment handling hazardous material.

Still another object of the invention is to provide a portable personnel shielding means which is adapted particularly for use with a canned motor-pump unit wherein the structural components of the motor-pump are utilized to furnish a portion of the biological shielding in addition to the shielding furnished by the portable shielding means when employed in conjunction with the aforesaid motor-pump unit.

A further object of the invention is the provision of portable shielded means adapted for association with an access port of radioactive or other hazardous equipment to afford limited access of maintenance personnel to the port while shielding them from exposure to the remainder of the equipment.

These and other objects, features and advantages of the invention will be made apparent during the ensuing description of illustrative modifications thereof with the description being taken in conjunction with the accompanying drawings, wherein:

FIG. 2 is a top plan view of the structure and portable shielding arrangement illustrated in FIG. 1;

FIG. 3 is a cross-sectional view of the portable shielding arrangement shown in FIG. 1 and taken along reference lines III—III thereof;

FIG. 4 is a partial cross-sectional view of a portion of the portable shielding arrangement as illustrated in FIG. 3 and taken along reference lines IV—IV thereof;

FIG. 5 is a top plan view of another form of portable shielding arrangement illustrated in accordance with the invention; and FIG. 6 is a longitudinally partially sectional view of one form of canned motor-pump unit with which the invention is adapted for use in the exemplary modifications of the invention described herein.

Figure 1:
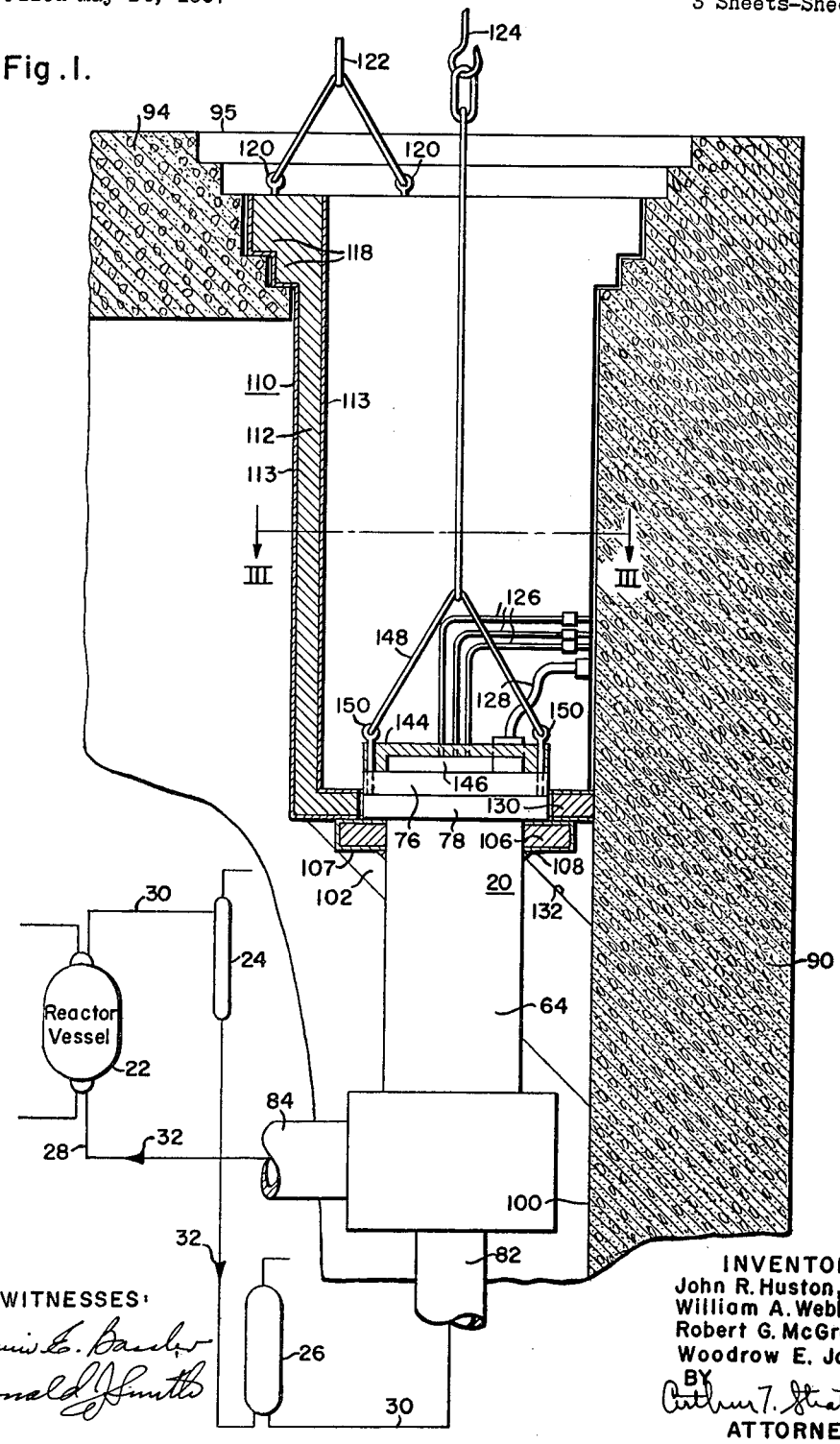
FIGURE 1 is a vertical sectional view of a portion of a nuclear plant structure and the portable shielding arrangement as taught by the invention, and shown here in an exemplary application in conjunction with a nuclear fuel circulating pump with other elements of the plant being shown diagrammatically.

In accordance with the invention, a portable personnel shielding means is provided which is adapted for affording limited access of maintenance personnel into the primary coolant loop chamber of the plant structure for maintaining equipment associated with the coolant loop. In this example of the invention, the portable shielding means is adapted for use in maintaining the circulating fuel pump of the primary coolant system, but obviously the invention is not limited thereto but is readily adaptable for purposes of affording limited access to any normally shielded equipment associated with a nuclear power plant. More particularly, the aforementioned portable shielding means is arranged in a manner that a part of the shielding afforded to personnel entering the shielding means is afforded by biological shielding of the plant structure which is normally provided adjacent the primary coolant loop, and by structural components of the aforesaid motor-pump unit and shielding members more or less permanently associated therewith. The portable shielding means of the invention is further arranged to be moved with relative ease to a similar shielding position at any one of a plurality of circulating fuel pumps with which the nuclear power plant normally is furnished.

Referring now more particularly to FIGS. 1 to 4 of the drawings, the illustrative form of the invention exemplified therein is adapted particularly for use, in this example, with a canned motor-pump unit 20. As described more fully in the aforesaid copending application, the canned motor-pump 20 is employed for circulating a portion of the fluid nuclear fuel through a reactor vessel 22 and one of the primary coolant loops thereof including for example, a gas entrainment separator 24 and a steam-generating heat exchanger 26. The circulating pump 20 is disposed within the aforedescribed coolant loop such that when the pump is operated the circulating reactor fuel flows through the associated inlet and outlet conduits 28 and 30, respectively, of the reactor vessel 22 in the direction indicated by flow arrows 32.

As better shown in FIGS. 1 and 6 of the drawings, the canned motor-pump unit 20 comprises a pumping casing 34 having a pumping volute 36 disposed therein within which, in turn, is arranged a pumping impeller 38. The impeller 38 is secured at the lower end of a rotatable shaft 40 in spaced relationship to a generally cylindrical and elongated canned motor rotor indicated generally by the reference character 42. The rotor 42 and its shaft 40 are mounted upon suitable bearings 44 for rotation within a hollow stator assembly indicated generally by the reference character 46. The stator assembly 46 is hermetically sealed or canned within a motor housing 48 by means of a metallic tube or can 50 which is supported by the bore of the stator assembly and by backing rings 52 secured to the stator assembly and to the motor housing 48. Hermetically sealed electrical connecting means is furnished to the stator assembly by a required number of electrical terminals, one of which is indicated generally by the reference character 54. The rotor 42 is of the windingless or squirrel cage type, and accordingly, no electrical connection therefor is required.

A cooling system is provided for the stator assembly 46 and, in this example, consists of a length of spiral tubing 56 which is confined within an annular space formed between an elongated housing section 58 and an inner sleeve 60 spaced inwardly of the housing section 58 but outwardly of the stator assembly 46. Suitable inlet and outlet conduits, indicated generally at 62, are provided for cooling fluid connections to the spiraled tubing 56.

The pumping casing 34 is further furnished with an elongated tubular casing section 64 secured to or formed integrally with the upward end thereof. The pump casing section 64 extends substantially coextensively with the motor housing section 58 which, in turn, extends along the length of the stator assembly 46 and associated rotor 42. The inner diameter of the pump casing section 64 is such that the cylindrical housing section 58 can be inserted therewithin to form a relatively close fit therein. When assembled in this fashion, the lowermost end 66 of the housing section 58 is spaced from the pumping volute 36 by an inwardly extending flange member 68 secured to the inner periphery of the pump casing 34, and by an outwardly projecting flange 70 secured to the outer periphery of a thermal barrier indicated generally by the reference character 72.

The thermal barrier 72 is secured to the lower end 66 of the housing section 58, by means of a plurality of mounting bolts 74 inserted through suitable apertures in the thermal barrier flange 70 and threaded into the lower end 66 of the housing section 58. Accordingly, when the parts are assembled in this fashion, the thermal barrier 72 is clamped between the lower end 66 of the housing section 58 and the inwardly extending flange 68 of the pump casing 34.

The pump casing section 64 and the housing section 58 are secured in their respective relative positions by means of a pair of outwardly extending flanges 76 and 78 which are secured respectively to the upward ends of the housing section 58 and the pump casing section 64. The housing section 58 then is secured within the pump casing section 64, as shown in FIG. 6 of the drawings, by means of a plurality of mounting bolts 80 inserted through suitable apertures in the upper or housing section flange 76 and threaded into suitably placed tapped holes formed in the lower or pump casing section flange 78. When the housing section and the pump casing section are secured in this fashion, the junction 81 therebetween is hermetically sealed by an annular member 83 coextending with the aforesaid junction and joined at its lateral edges to the housing section 58 and to the pump casing section 64, as by seal-welding. Accordingly, a completely hermetically sealed case is provided for the motor-pump unit which, in turn, is hermetically sealed into the primary coolant loop as by welding the suction and discharge ports 82 and 84 to the outlet and inlet conduits 30 and 28, respectively, of the reactor vessel 22.

As illustrated in FIG. 6, the motor section of the canned motor-pump, together with the impeller 38 and thermal barrier 72 can be removed as a unit from the pump casing 34 and the associated casing section 64 by removing the mounting bolts 80 and by circumferentially cutting the annular sealing member 83. When this has been effected, the housing section 58 and other components of the motor section, together with the thermal barrier 72 and the impeller 38, can be withdrawn upwardly and out of the elongated pump casing section 64. It will be appreciated that the outer diameters, respectively, of the thermal barrier 72 and the impeller 38 are of such size that these components can be readily withdrawn from the lower regions of the pump casing and from its extension 64.

In the operation of the canned motor-pump 20 within the aforesaid primary coolant loop, those areas of the pump casing 34 which are adjacent the pumping volute 36, the impeller 38, and the suction and discharge ports 82 and 84 will become highly radioactive due to irradiation thereof by neutrons and other atomic radiations associated with the circulating nuclear fuel. In order to prevent the motor section components from becoming highly radioactive in a similar manner, a purging flow of the nuclear fuel vehicle, for example, water or deuterium oxide, is maintained through the motor section by means of inlet and outlet conduits 86 and 88, respectively. A portion of this purging flow flows past a labyrinth seal (not shown) mounted adjacent the driving shaft 40 and into the pump casing 34. This limited flow of the purging vehicle prevents the accumulation of slurry particles within the motor section of the motor-pump unit and the attendant inducement of a high level of radioactivity within the motor section.

As a result, the structural components of the motor section provide a certain amount of biological shielding, to personnel servicing the motor-pump unit from a position adjacent the top thereof, from the highly radioactive thermal barrier 72 and pumping impeller 38 secured adjacent the lower extremity of the removable motor section. Moreover, the disposition of the detachable sealing and joining means, including the mounting bolts 80, the flanges 76 and 78, and the hermetic sealing means 83, adjacent the upward end of the canned motor-pump 20 permits removal of the motor section and associated components from a position adjacent the top of the motor-pump at a location removed from its highly radioactive, permanently installed pump casing 34.

Referring once again to FIGS. 1 to 4 of the drawings, the aforedescribed canned motor-pump 20, in this example of the invention, is mounted adjacent a concrete shielding wall 90 which forms part of a series of cells into which the reactor vessel 22 and the associated primary coolant loops are disposed, as better shown in the aforesaid copending application. In this arrangement, the shielding wall 90 is approximately six feet in thickness and is fabricated from concrete mixed with a suitable densifying material, such as barytes, in order to provide adequate biological shielding from neutron and gamma radiation. A cell portion 92 thus formed is provided additionally with a top shielding covering 94 of approximately four and one-half feet in thickness and likewise fabricated from concrete and the aforesaid densifying material.

As better shown in FIG. 2 of the drawings, the top shielding covering 94 is provided with a rectangular opening 95, the side walls 96 of which are each formed with a plurality of offset surfaces 98. A plug member, not shown, but having a complementary configuration to engage rather closely the aforesaid offset surfaces is furnished for normally closing the opening 95, when the portable shielding means presently to be described is not being utilized. The engagement of these offset surfaces by the aforesaid plug member eliminates any direct radiational paths between the opening and the plug member. The rectangular opening 95 in this application is arranged more or less directly over the pump 20 such that the center of the opening 95 is eccentric relative to the vertical axis of the pump 20, for purposes hereinafter to be elaborated upon.

To the inward surface 100 of the shielding wall 90 are permanently secured a pair of supporting brackets 102 and 104. These supporting brackets are disposed one on each side of the motor-pump unit 20 and are arranged for at least partially supporting the portable shielding means when the latter is utilized in conjunction with the maintenance of the motor-pump 20. When the motor-pump is installed in its permanent location as aforesaid, a shielding collar 106 is secured to the pump casing section 64 and is disposed immediately below the pump casing flange 78. The shielding collar 106 desirably is formed from an efficient shielding material, for example lead encased in a steel sheath 107 for structural strength, and is secured to the outer surface of the pump casing section 64 as by the annular structural weld 108.

The shielding collar 106 is provided with sufficient thickness, which in the case of steel encased lead is approximately 7 inches, in order to prevent the passage of dangerous radiation from the highly radioactive pump casing 34 and other parts of the coolant loop from streaming upwardly and adjacent the mounting flanges 76 and 78 of the canned motor-pump when employed in conjunction with the portable shielding means presently to be described.

One form of the aforesaid portable shielding means comprises a shielded personnel booth 110 which with its three side walls 112 forms a three-sided structure, as better shown in FIG. 2 of the drawings. The components of the booth in the example are sheathed in a structural material, such as steel cladding 113. The portable booth is provided with a partial permanent floor 114 of generally L-shaped configuration which thus defines a cutaway or generally rectangular opening 116 in the booth floor 114. The side walls 112 and the partial floor 114 in this example are formed from steel encased lead of approximately the same thickness as that denoted heretofore in connection with the shielding collar 106. In one application of the invention the booth 110 is arranged for use adjacent the inward surface 100 of the shielding wall 90, with which surface the booth forms a shielded enclosure at the operative position of the booth, as described hereinafter. In other applications of course, the booth can be provided in the form of a more or less completely enclosed structure.

Adjacent the upper extremity of the shielding booth 110, a plurality of tiered or successively overhanging portions 118 are furnished for engaging some of the offset surfaces 98 of the plug opening 95. The overhanging portions 118, with two being employed in this example of the invention, are arranged at least partially to support the weight of the portable booth 110 by the engagement of their undersurfaces with the horizontal surfaces of the offset portions 98. Additionally, the aforesaid engagement of these surfaces prevents neutronic and other radiation from streaming outwardly of the opening 95, when the portable booth 110 is lowered through this opening and onto the supporting brackets 102. To lend stability and added support to the booth 110, the overhanging portions of the opposed booth walls 112 project beyond the inside surface 100 of the shielding wall 90, as indicated by the reference characters 119 (FIG. 2).

For manipulating the portable booth 110 in this fashion, a pair of eye hooks 120 are provided adjacent each of the opposed side walls 112 to which a suitable cable sling, indicated generally by the reference character 122, is attached for manipulation by means of a crane hook 124. As the portable booth is being lowered into its operative position, the cutaway or open portion 116 of the floor 114 thereof permits the structural components of the booth to be dropped over the purging and coolant piping connections coupled to the motor-pump 20 and indicated collectively by the reference character 126, and over the electrical leads 128. These piping and electrical leads are conducted through the shielding wall 90 in a suitable manner (not shown) for connection to external fluid and electrical circuitry, respectively. Alternatively, the leads 126 and 128 can be coupled to the pump at points farther down the casing thereof.

To aid in lowering the portable booth 110 through the opening 95 to its operative position relative to the mounting flanges 76 and 78 of the canned motor-pump 20, suitable, shielded guiding means are furnished. One form of such guiding means includes a vertically extending tongue 125 secured to desirably the outer surface of each of the opposed walls 112 of the booth 110 adjacent the free lateral edge 127 thereof. The tongues 125 are thus disposed for cooperation with a pair of similarly spaced elongated, oppositely located grooved members 129 secured to the inner surface 100 of the shielding wall 90. The grooved members desirably coextend with the length of the prescribed path through which the booth member is moved, and in this example, the grooved members coextend with substantially the height of the booth walls 112 when the portable booth has been lowered to its operative position.

The tongue and groove arrangements 125 and 129 are each shielded, in this example, by a lead shielding member 131 of substantially L-shaped cross section and extending desirably along the entire length of the aforesaid tongue and groove arrangements. The shielding members 131 are secured either to the portable booth member 110, or as in this example, to the adjacent surfaces 100 of the wall 90, and are formed with approximately the same thickness of lead as that described heretofore in connection with the booth walls 112 and the shielding collar 106. Adequate structural strength of the shielding members 131 is afforded in this example by a steel cladding member 133.

When the portable booth is disposed in its operative position, its floor opening 116 is filled substantially with a permanently installed floor section 130, which is mounted in a position generally below the aforesaid piping and electrical connections 126 and 128 and secured to the shielding wall 90 by means of a pair of supporting brackets 132. Alternately, the floor portion can be secured directly to the flange 78 of the motor-pump 20, as by welding or, through the use of suitable brackets secured to the pump casing extension 64, and the floor section 130 can be mounted on the motor-pump 20 at a position in the same general plane as that of the pump casing flange 78. The floor portion 130 is provided with a semicircular cutout section 134 which normally fits relatively closely with the mounting flange 78 and is secured as aforesaid to the permanently installed pump casing section 64. As better shown in FIG. 4 of the drawing, the junction 136 between the portable booth floor 114 and the permanently installed flooring section 130, is sealed against the entry of radiation by means of the overlapping portions 138 and 140 which protrude respectively from the portable booth floor 114 and the flooring section 130. These overlapping portions 138 and 140 are coextensive with the junction 136 between the booth floor 114 and the flooring section 130. In a similar manner, neutronic and other radiation is prevented from entering about the periphery of the mounting flange 78 where the latter is disposed in proximity to the booth floor 114 and the flooring section 130, by means of the shielding collar 106 described heretofore and arranged to underlie the junction of the booth floor 114 and flooring section 130 with the mounting flange 78. As a result, there is no direct line of approach, through which radiation can enter the booth, in the composite floor of the shielding booth when the latter is in its operative position.

The portable booth 110 is equipped with an access ladder 142 which is disposed vertically and is secured desirably to that wall 112 of the booth which is farthest removed from the motor-pump 20. Sufficient eccentricity of the booth 110 relative to the pump 20 is arranged so that adequate space is provided for maintenance personnel in descending the ladder 142 from the opening 95 and the shielding cover 94 and for work space at those areas of the booth floor adjacent the pump 20. Additional shielding means for the pump 20 is afforded, if required, in the form of a cover 144 secured to end plate 146 of the motor housing 48. Referring now more particularly to FIGS. 1 and 6, upon having entered the portable shielding booth 110 when in its operative position, maintenance personnel are protected for a time sufficient for removing the mounting bolts 80 and for cutting the annular sealing member 83 which hermetically seals the junction 81 between the permanently installed pump casing section 64 and the motor housing section 58. After the mounting flanges 76 and 78 are disconnected in this manner, a cable sling 148 is secured to a pair of eye hooks 150 which are threaded in diametric opposition into suitable tapped holes of the housing mounting flange 76. Alternatively, the sling 148 and the eye hooks 150 can be permanently secured to the housing flange 76. The personnel then remove themselves to a safe location whereupon a remotely operated crane is employed to lift the entire motor section of the motor-pump 20, together with the highly radioactive thermal barrier 70 and pumping impeller 38, to a maintenance hot cell whereupon the motor section or components thereof can be repaired or replaced by remotely operated equipment.

Referring now more particularly to FIG. 5 of the drawings, another form of portable shielding means is illustrated therein. The last-mentioned shielding means comprises a portable booth 152 which is adapted for use with a canned motor-pump 20' which in this example is mounted at a corner of the coolant loop cell, as defined by the biological shielding walls 154 and 156. The pump 20' is provided with similar piping and electrical connections, and a rectangular opening 159 is formed more or less directly above the pump in a biological shielding cover 158. The opening 159 is provided with offset surfaces in the manner described heretofore in connection with the opening 95 of FIGS. 1 and 2 of the drawings, and is adapted to receive a plug member or upper tiered portions 160 of the portable booth 152.

In this example of the invention, however, the portable booth 152 comprises a pair of walls 162 which are joined more or less at right angles to one another in a vertical junction and to which is joined a triangular floor section 164. The inner wall surfaces 166 and 168 of the cell shielding walls 154 and 156, respectively, form the remaining two sides of the shielded booth 152 when the latter is in its operative position. The partial triangular floor 164 of the portable booth 152 permits clearance for the aforesaid piping and electrical connections of the pump 20' in a manner described heretofore. The floor section 164 is further provided with a generally semicircular cutout portion 170, which is adapted to fit relatively closely with the pump casing mounting flange 78 (FIG. 1) when the booth has been lowered to its operative position. A cooperating floor section 172 is permanently secured to the inner wall surfaces 166 and 168, and when thus secured is disposed adjacent the pump casing mounting flange 78. Similarly, the permanently installed floor section 172 is provided with a semicircular cutout 174, which in conjunction with the cutout 170 of the portable booth floor 164 provides a relatively close fit between the floor sections 172 and 164 with the pump casing mounting flange 78 when the portable booth is in its operative position.

The junction 176 between the aforesaid floor portions is arranged to prevent radiation streaming in a manner similar to that described in connection with FIG. 4 of the drawings. In the same manner, radiation entering about the periphery of the pump casing flange is prevented by means of the permanently installed pump shielding collar 106. At the top of the portable booth 152, a pair of lifting hooks 178 are secured whereby the portable booth can be raised and lowered relative to the opening 159 and the pump 20' by the aforesaid remotely operated crane. Adjacent the outward lateral edges of the booth walls 162, the associated portions of the inner shielding wall surfaces 166 and 168 are provided with shielded tongue and groove arrangements indicated generally by the reference characters 180 and 182. These latter-mentioned tongue and groove arrangements are essentially similar to those described heretofore in connection with FIG. 3 of the drawings, and accordingly, further elaboration thereon would appear to be unnecessary.

From the foregoing, it will be apparent that a novel and efficient shielding arrangement has been disclosed whereby maintenance personnel can enter the hot or highly radioactive cells or compartments of the nuclear power plant for limited times. When the portable shielding means is employed in conjunction with equipment of suitable configuration, such as the top bolted canned motor-pump 20, this limited time is sufficient to permit removal of the major portion of the pump without unduly subjecting maintenance personnel to the radioactive hazards associated with the nuclear power plant. Although the invention has been described primarily in conjunction with semidirectly maintaining a canned motor-pump employed in conjunction with a homogeneous nuclear power plant, it will be obvious that the portable shielding means can be adapted with equal facility for servicing other types of equipment employed within a homogeneous plant or in other applications involving extremely high levels of radioactivity.

Therefore, numerous modifications of the invention will occur to those skilled in the art without departing from the spirit and scope of the invention. Moreover, it is to be understood that certain features of the invention can be employed without a corresponding use of other features.

Accordingly, what is claimed as new is:

1. In combination with a sealed motor-pump unit having overlapping elongated pump casing and motor housing extensions, said extensions being joined by a pair of bolted flanges secured respectively to said extensions and disposed adjacent the top of said pump, said pump being mounted in a generally vertical position, a relatively stationary shielded upstanding wall structure mounted adjacent said pump, a relatively stationary shielding floor section having a portion thereof shaped substantially to engage a portion of the outer periphery of said pump casing extension at a position adjacent the top of the pump, said stationary floor section extending outwardly from said pump casing extension at an angle to and engaging said wall structure, a portable shielded booth member having at least one upstanding wall section formed to provide a partial enclosure having a side opening engageable with said stationary wall structure so that said wall section and said wall structure cooperate to form an enclosure generally surrounding said pump top at the operative position of said booth member, means for supporting said booth member at said operating position, a shielded complementary floor section secured to said upstanding wall section and extending substantially in a plane parallel to that of said stationary floor section, said complementary floor section having an opening therein shaped so that said stationary floor section and the remainder of the outer periphery of said pump casing extension can be relatively closely fitted therein and substantially aligned with said complementary floor section at said operative position of the booth member, said complementary floor section and said stationary floor section when so aligned together forming a substantially continuous floor of said enclosure and surrounding said pump casing extension.

2. A radiation-shielding arrangement for use with radioactive equipment, said arrangement comprising in combination an access port member coupled to said equipment, a relatively stationary shielded wall structure mounted adjacent to said access port member, a relatively stationary shielded floor section having a portion shaped substantially to engage a portion of the outer periphery of said access port member, said floor section extending away from said access port member and being disposed at an angle to and in engagement with said wall structure, a portable shielded booth member having at least one upstanding wall section formed to provide a partial enclosure having a side opening engageable with said stationary wall structure so that said wall section and said wall structure cooperate to form an enclosure generally surrounding said access port meber at the operative position of said booth member, means for supporting said booth member at said operative position, a shielded complementary floor section secured to said upstanding wall section, said complementary floor section having an opening therein shaped so that the remainder of the outer periphery of said access port and said stationary floor section can be relatively closely fitted therein and substantially aligned with said complementary floor section at said operative position, said complementary floor section and said stationary floor section extending in substantially the same plane at said operative position so that said floor sections when so aligned together form a substantially continuous floor of said enclosure, and said continuous floor surrounding said access port member.

3. A radiation-shielding arrangement for use with radioactive equipment, said arrangement comprising in combination an access port member coupled to said equipment, a relatively stationary shielded wall structure mounted adjacent to said access port member, a relatively stationary floor section having a portion thereof shaped substantially to engage a portion of the outer periphery of said access port member, said stationary floor section extending away from said access port member and being disposed at an angle to and in engagement with said wall structure, a portable shielded booth member having at least one upstanding wall section formed to provide a partial enclosure having a side opening engageable with said stationary wall structure so that said wall section and said wall structure cooperate to form an enclosure generally surrounding said access port member at the operative position of said booth member, means for supporting said booth member at said operative position, a shielded complementary floor section secured to said upstanding wall section, said complementary floor section having an opening therein shaped so that said stationary floor section and the remainder of the outer periphery of said access port member can be relatively closely fitted in said opening and substantially aligned with said complementary floor section at said operative position, said complementary floor section and said stationary floor section extending in substantially parallel planes, said complementary and said stationary floor sections when so aligned together forming a substantially continuous floor of said enclosure, said continuous floor surrounding said access port member, and shielded means coupled to at least one of said stationary floor section, said complementary floor section, and said access port member and disposed adjacent the junctions therebetween for preventing radiation streaming into said booth member through said junctions at the operative position of said booth member.

4. A radiation-shielding arrangement for use with radioactive equipment, said arrangement comprising in combination an access port member coupled to said equipment, a relatively stationary shielded wall structure mounted adjacent to said access port member, a relatively stationary shielded floor section having a portion shaped substantially to engage a portion of the outer periphery of said access port member, said floor section extending away from said access port member and being disposed at an angle to and in engagement with said wall structure, a portable shielded booth member having at least one upstanding wall section formed to provide a partial enclosure having a side opening engageable with said stationary wall structure so that said wall section and said wall structure cooperate to form an enclosure generally surrounding said access port member and the operative position of said both member, means for supporting said booth member at said operative position, a shielded complementary floor section secured to said upstanding wall section, said complementary floor section having an opening therein shaped so that the remainder of the outer periphery of said access port and said stationary floor section can be relatively closely fitted therein and substantially aligned with said complementary floor section at said operative position, said complementary floor section and said stationary floor section extending in substantially the same plane at said operative position so that said floor sections when so aligned together form a substantially continuous floor of said enclosure, said continuous floor surrounding said access port member, and an annular shielded member surrounding said access port member and secured thereto, said annular member being disposed adjacent the junction between said access port member and said floor sections and coextending with said junction for preventing radiation streaming into said booth through said junction.

5. A radiation-shielding arrangement for use with radioactive equipment, said arrangement comprising in combination an access port member coupled to said equipment, a relatively stationary shielded wall structure mounted adjacent to said access port member, a relatively stationary shielded floor section having a portion shaped substantially to engage a portion of the outer periphery of said access port member, said floor section extending away from said access port member and being disposed at an angle to and in engagement with said wall structure, a portable shielded booth member having at least one upstanding wall section formed to provide a partial enclosure having a side opening engageable with said stationary wall structure so that said wall section and said wall structure cooperate to form an enclosure generally surrounding said access port member at the operative position of said booth member, means for supporting said booth member at said operative position, a shielded complementary floor section secured to said upstanding wall section, said complementary floor section having an opening therein shaped so that the remainder of the outer periphery of said access port and said stationary floor section can be relatively closely fitted therein and substantially aligned with said complementary floor section at said operative position, said complementary floor section and said stationary floor section extending in substantially the same plane at said operative position so that said floor sections when so aligned together form a substantially continuous floor of said enclosure, said continuous floor surrounding said access port member, means for moving said booth member in a prescribed path toward and away from said operative position, and cooperative shielded guiding means coupled to said wall structure and to said both wall section for guiding said booth member in said path.

6. In combination, equipment handling hazardous material and having a maintenance access port member, said equipment being disposed within a shielded cell, said cell including at least one first shielding wall disposed adjacent said equipment, and a second shielding wall, means for mounting said second wall at a position adjacent said first wall, said second wall having an aperture located in the lateral surface thereof at a position near said first wall and juxtaposed to said access port member, means for normally closing and shielding said aperture, a portable shielding enclosure shaped for relatively closely fitted insertion through said second wall aperture, said enclosure when so inserted extending from said aperture to said access port member in the operative position of said enclosure and having an opening in its inner end shaped so that said access port member can be relatively closely fitted therein to expose said port to operating or maintenance personnel when located within said enclosure and to shield the personnel when so located from the remainder of said equipment, said enclosure in addition being at least partially supported by engagement with an edge portion of said second wall adjacent said aperture, and said enclosure being so shaped that at the operative position thereof said enclosure substantially closes said aperture to prevent the escape of said hazardous material from said cell.

7. A radiation-shielding arrangement for use with radioactive equipment disposed within a shielded cell, said arrangement comprising in combination an access port member coupled to said equipment, at least one upstanding wall structure of said cell mounted adjacent said access port member, a shielded top covering for said cell having an aperture therein disposed adjacent to said cell wall structure, said covering having a peripheral offset portion surrounding said aperture, a relatively stationary shielded floor section having a portion shaped substantially to engage a portion of the outer periphery of said access port member, said stationary floor section extending away from said access port member and being disposed at an angle to and in engagement with said wall structure, a portable shielded enclosure having at least one upstanding wall section formed to provide a partial enclosure having a side opening engageable with said wall structure so that said wall section and said wall structure cooperate to form an enclosure generally surrounding said access port member at the operative position of said enclosure, a shielded complementary floor section secured to said upstanding wall section, said complementary floor section having an opening therein shaped so that said stationary floor section and the remainder of the outer periphery of said access port member can be relatively closely fitted therein and substantially aligned with said complementary floor section at said operative position, said complementary floor section and said stationary floor section extending in substantially parallel planes so that when said sections are so aligned they together form a substantially continuous floor of said enclosure, said continuous floor surrounding said access port member, means for lowering said enclosure member through said covering aperture to said operative position, and cooperating means coupled to said covering at the aperture thereof and to said enclosure member adjacent the upper end of said enclosure wall section for at least partially supporting said enclosure member at said operative position.

8. In combination, equipment handling hazardous material and having a maintenance access port member, at least one first shielding wall disposed adjacent said equipment, a second shielding wall, means for mounting said second wall at a position adjacent said first wall, said second wall having an aperture located in the lateral surface thereof at a position near said first wall and juxtaposed to said access port member, means for normally closing and shielding said aperture, a portable shielding enclosure member shaped for relatively closely fitted insertion through said second wall aperture, said enclosure member when so inserted extending from said aperture to said access port member in the operative position of the enclosure and having an opening in its inner end shaped so that said access port member can be relatively closely fitted therein to expose said port to operating or maintenance personnel when located within said enclosure member and to shield the personnel when so located from the remainder of said equipment, said enclosure in addition being at least partially supported by engagement with an edge portion of said second wall adjacent said aperture.

References Cited in the file of this patent
UNITED STATES PATENTS

| 2,594,970 | Monk | Apr. 29, 1952 |
| 2,774,730 | Young | Dec. 18, 1956 |

OTHER REFERENCES

TID–5276, "Chemical Processing and Equipment," U.S. Government Printing Office, 1955, page 61.

Proceedings of the International Conference on the Peaceful Uses of Atomic Energy, Aug. 8–20, 1955, vol. 14, pages 72–73.

Nucleonics, vol. 13 (June 1955), page 53; vol. 14 (November 1956), page 119.